United States Patent [19]
Fukunaga

[11] Patent Number: 5,511,640
[45] Date of Patent: Apr. 30, 1996

[54] LOCK-UP DEVICE FOR TORQUE CONVERTER

[75] Inventor: Takao Fukunaga, Neyagawa, Japan

[73] Assignee: Kabushiki Kaisha Daikin Seisakusho, Osaka, Japan

[21] Appl. No.: 213,186

[22] Filed: Mar. 15, 1994

[30] Foreign Application Priority Data

Mar. 18, 1993 [JP] Japan .................. 5-012090 U

[51] Int. Cl.⁶ .................. F16H 45/02; F16D 3/14
[52] U.S. Cl. .................. 192/3.28; 192/3.3; 192/70.17; 192/214.1
[58] Field of Search .................. 192/3.28, 3.29, 192/3.3, 30 V, 70.17, 106.1, 106.2, 214.1; 464/68

[56] References Cited

U.S. PATENT DOCUMENTS

| | | | |
|---|---|---|---|
| 3,578,121 | 5/1971 | Maurice | 464/68 X |
| 4,257,509 | 3/1981 | Hiraiwa et al. | |
| 4,559,024 | 12/1985 | Tamura et al. | 192/106.2 X |
| 4,735,297 | 4/1988 | Koshimo | 192/3.29 |
| 5,054,590 | 10/1991 | Paulsen | 192/3.29 X |
| 5,121,821 | 6/1992 | Poorman et al. | 192/3.28 |
| 5,211,270 | 5/1993 | Tamura et al. | |

FOREIGN PATENT DOCUMENTS

| | | |
|---|---|---|
| 3423208A1 | 1/1985 | Germany . |
| 58-196361 | 11/1983 | Japan . |
| 2-245562 | 10/1990 | Japan .................. 192/3.3 |

*Primary Examiner*—Richard M. Lorence
*Attorney, Agent, or Firm*—Knobbe, Martens, Olson & Bear

[57] ABSTRACT

A lock-up device for a torque converter is disposed between a front cover 1 and a turbine 3, and comprises a clutch mechanism 10 for connecting the front cover 1 and an output member to each other and releasing the connection therebetween, an elastic connecting mechanism 11 comprising a torsion spring 22 for elastically connecting the clutch mechanism 10 and a turbine hub 6 to each other, and a hysteresis torque generating mechanism 12 disposed radially outward of the torsion spring 22 for damping torque variations from the front cover 1.

4 Claims, 3 Drawing Sheets

LOCK-UP DEVICE FOR TORQUE CONVERTER

BACKGROUND OF THE INVENTION

The present invention relates generally to a lock-up device for a torque converter, and more particularly, to a lock-up device for a torque converter disposed between an input member and an output member of the torque converter.

Conventional torque converters which have a lock-up device for mechanically connecting an input front cover and an output member to each other. The lock-up device is disposed between a turbine connected to the output member and the input front cover, and is made up of, for example, a clutch mechanism, and an elastic connecting mechanism for elastically connecting the clutch mechanism and the turbine to each other. In addition, there have also been provided lock-up devices incorporating a hysteresis torque generating mechanism for the purpose of damping vibration.

In this kind of torque converter, laving a lock-up device, when engine revolution becomes high, the front cover and the turbine mechanically engage each other through the clutch mechanism. When torque is transmitted through the clutch mechanism, it is possible to damp torque variations from the engine with hysteresis torque generated from a hysteresis torque generating mechanism in the clutch mechanism.

Conventional lock-up devices for a torque converter have inherited their structure directly from their dry-type predecessors. However, there are design restrictions that arise within a lock-up torque convertor which seriously affect the efficiency of the hysteresis torque generating mechanism used in these devices.

The first restriction common to these devices, occurs due to the crowded radial center of the torque convertor where the device is located. The hysteresis torque generating mechanism is cramped by a multiple of independently rotating elements, all requiring separate hubbed connection around the output shaft. This severe restriction with respect to space, removes the possibility of providing a hysteresis device with a larger frictional contact area for damping larger vibrations.

This condition is further complicated by the fact that hysteresis torque obtainable from any given mechanism is greater dry than it is wet. The wet operation of the hysteresis torque generating mechanism in a torque convertor lock-up device, further restricts efficiency at which dry-type clutch discs can be adopted for use therein.

These circumstances greatly minimize the ability for the hysteresis torque generating mechanism to produce damping forces. To damp greater vibrations by incorporating stronger pressure discs into the device, negatively affects durability of all the relative parts, but this is the only option available with the conventional technology. Therefore, it is generally difficult to maintain desired hysteresis torque characteristics for a long time.

SUMMARY OF THE INVENTION

The primary object of the present invention is to stabilize the characteristics of a hysteresis torque generating mechanism in a lock-up device for a torque converter.

A lock-up device for a torque converter according to the present invention is disposed between an input member and an output member of the torque converter, which comprises a clutch mechanism for connecting the input member and the output member to each other and releasing the connection therebetween, an elastic connecting mechanism comprising a torsion spring for elastically connecting the clutch mechanism and the output member to each other, and a hysteresis torque generating mechanism disposed radially outward of the torsion spring for damping torque variations from the input member.

In the lock-up device for the torque converter according to the present invention, torque is directly transmitted to the output member from the input member through the elastic connecting mechanism when the clutch member is engaged. When the lock-up device is in operation, torque variations are damped by the hysteresis torque generating mechanism.

By disposing the hysteresis torque generating mechanism radially outward of the torsion spring, the available frictional contact area is increased, and it s thereby possible to further increase the outer diameter of the hysteresis torque generating mechanism. Therefore, with respect to the friction washer of the previous example, a pressIng load necessary to obtain the same damping force obtained in conventional devices is less. In otherwords, the same damping force may be produced at a lower pressure to area ratio, thereby increasing durability of the hysteresis torque generating mechanism. Less wear on the mechanism, makes it possible to maintain desired characteristics for a long time.

DESCRIPTION OF THE PREFERRED EMBODIMENTS

Figure 1:
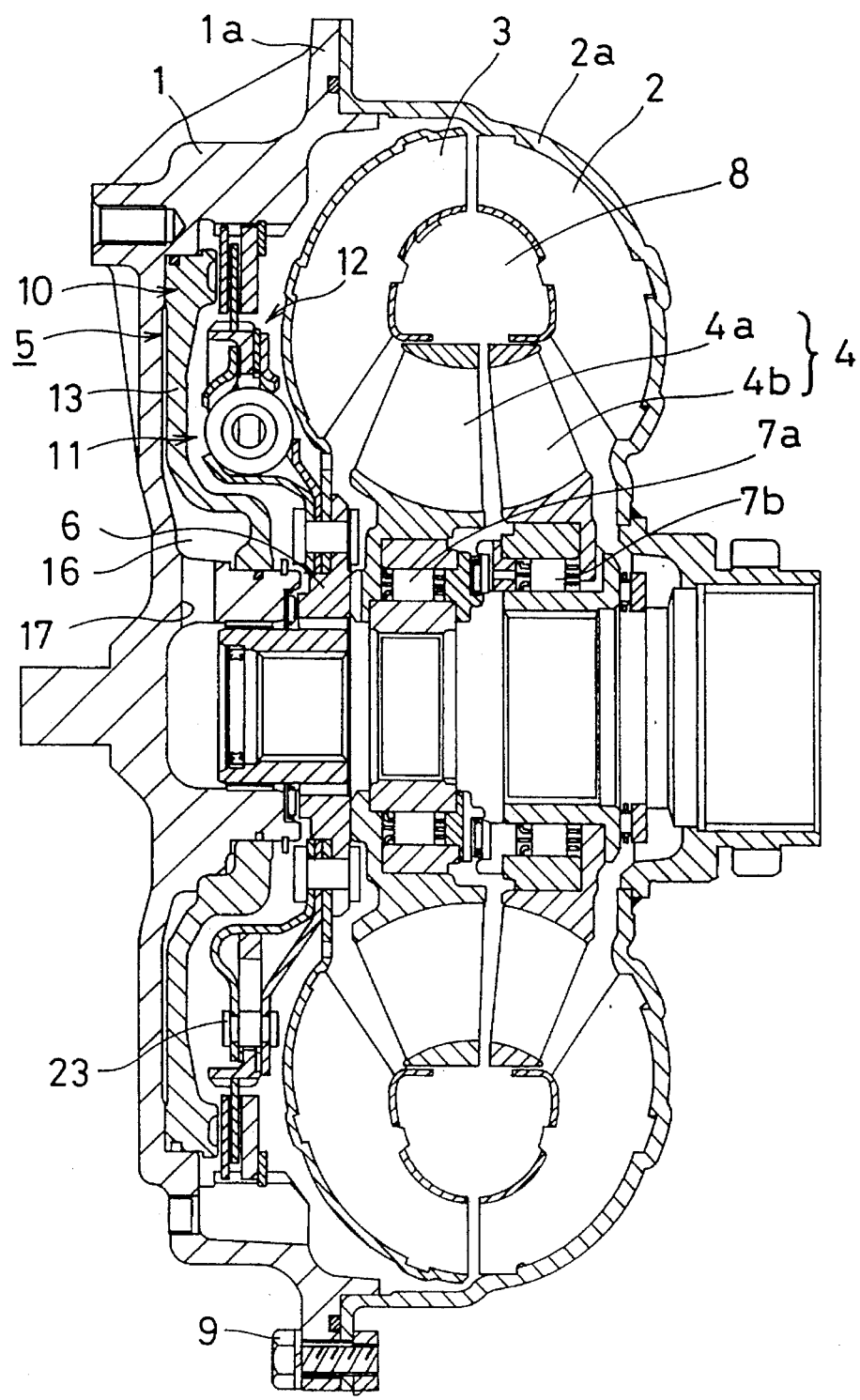
FIG. 1 is a longitudinal sectional view showing a torque converter according to one embodiment of the present invention.
Figure 2:
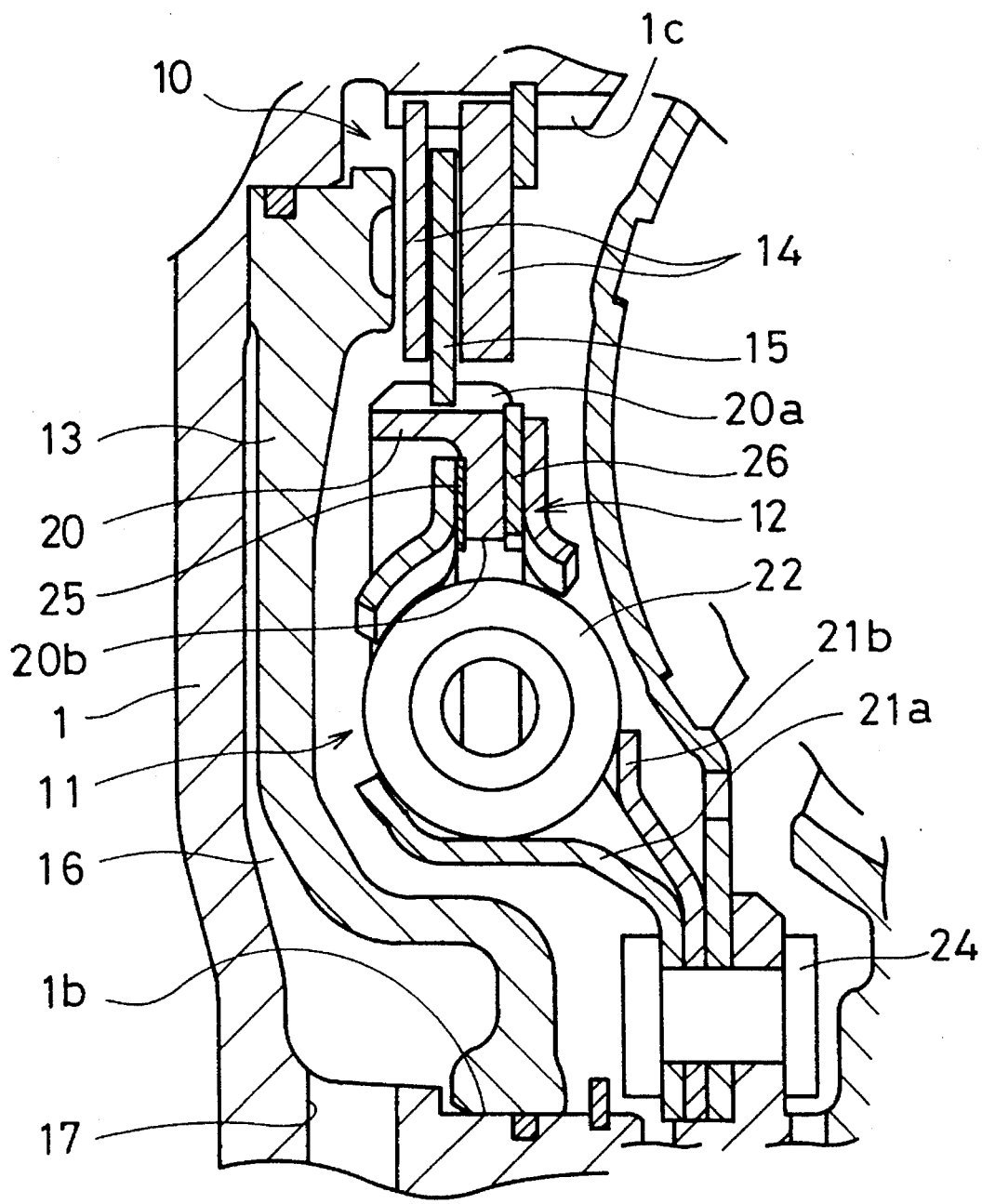
FIG. 2 is a partially enlarged view of the lock-up device shown In FIG. 1.

FIGS. 1 and 2 show a lock-up device for a torque converter according to one embodiment of the present Invention.

In FIG. 1, a torque converter is mainly composed of a front cover 1, an impeller 2, a turbine 3, a stator 4 and a lock-up device 5. The impeller 2, the turbine 3 and stator 4 are concentrically disposed within the front cover 1. The lock-up device 5 is disposed between the front cover 1 and the turbine 3. In this example, the stator 4 is constituted by two separated stators 4a and 4b.

The front cover 1 is connected to an input member (not shown) of an engine. A radially outer wall of an impeller shell 2a of the impeller 2 is fixed to a radially outer wall 1a of the front cover 1 by a bolt 9. A plurality of blade members are disposed inside the impeller shell 2a. The turbine 3 is disposed in a position opposite to the impeller 2, and also contains the plurality of blade members. A radially inner end of the turbine 3 is fixed to a radially outer portion of a turbine hub 6. The hub 6 is splined on its radially inner portion to engage with a shaft of a transmission (not shown). The two separated stators 4a and 4b are disposed between a radially inner portion of the impeller 2 and a radially inner portion of the turbine 3. The stators 4a and 4b are respectively connected to members (not shown) of the transmission through one-way clutches 7a and 7b. The hydraulic fluid chamber 8 is defined by the space enclosed by the front cover 1 and the impeller shell 2a.

The lock-up device 5 has a clutch mechanism 10, an elastic connecting mechanism 11, and a hysteresis torque generating mechanism 12. The clutch mechanism 10 is a mechanism for connecting the Front cover i and the elastic connecting mechanism 11 to each other or releasing the connection therebetween, and has a piston 13, an input clutch plate 14, and an output clutch plate 15. The piston 13 is formed in an approximate disk shape, and is axially movable within a cylinder part 1b formed in the front cover 1. A hydraulic fluid chamber 16 Is formed between the cylinder part 1b and the piston 13, to which a hydraulic fluid is supplied through a hydraulic fluid passage 17. The input clutch plate 14 is a ring-shaped member, and has a spline formed in its radially outer portion. This spline is engaged with a spline 1c formed on an inner surface of a radially outer portion of the front cover 1. Consequently, the input clutch plate 14 is rotated along with the front cover 1 and is axially movable. The output clutch plate 15 is a ring-shaped member, and is disposed so as to be interposed between the two input clutch plates 14. A spline is formed in a radially inner portion of the output clutch plate 15, and friction members are bonded to both side surfaces thereof.

The elastic connecting mechanism 11 is disposed radially inward of the clutch mechanism 10, and has an input flange 20, a pair of output side plates 21a and 21b, and a torsion spring 22 for elastically connecting the flange 20 and the pair of side plates 21a and 21b to each other. A spline 20a is formed in a radially outer portion of the flange 20, for splined connection with the splines (15a) formed in the radially inner portion of the output clutch plate 15 of the clutch mechanism 10. Clutch plate 15 is axially movable with respect to flange 20. In addition, a plurality of notches 20b are equally spaced in the circumferential direction in a radially inner portion of the flange 20, for holding torsion spring 22. The plates 21a and 21b are disposed so as to interpose the flange 20 and the torsion spring 22 therebetween, and are connected to each other having a predetermined spacing using stop pins 23 (see FIG. 1). Radially inner portions of the side plates 21a and 21b are fixed to the radially outer portion of the turbine hub 6. The torsion spring 22 is held by the raised portions in respective side plates 21a and 21b, and are formed to correspond with notches 20b of the flange 20.

Figure 3:
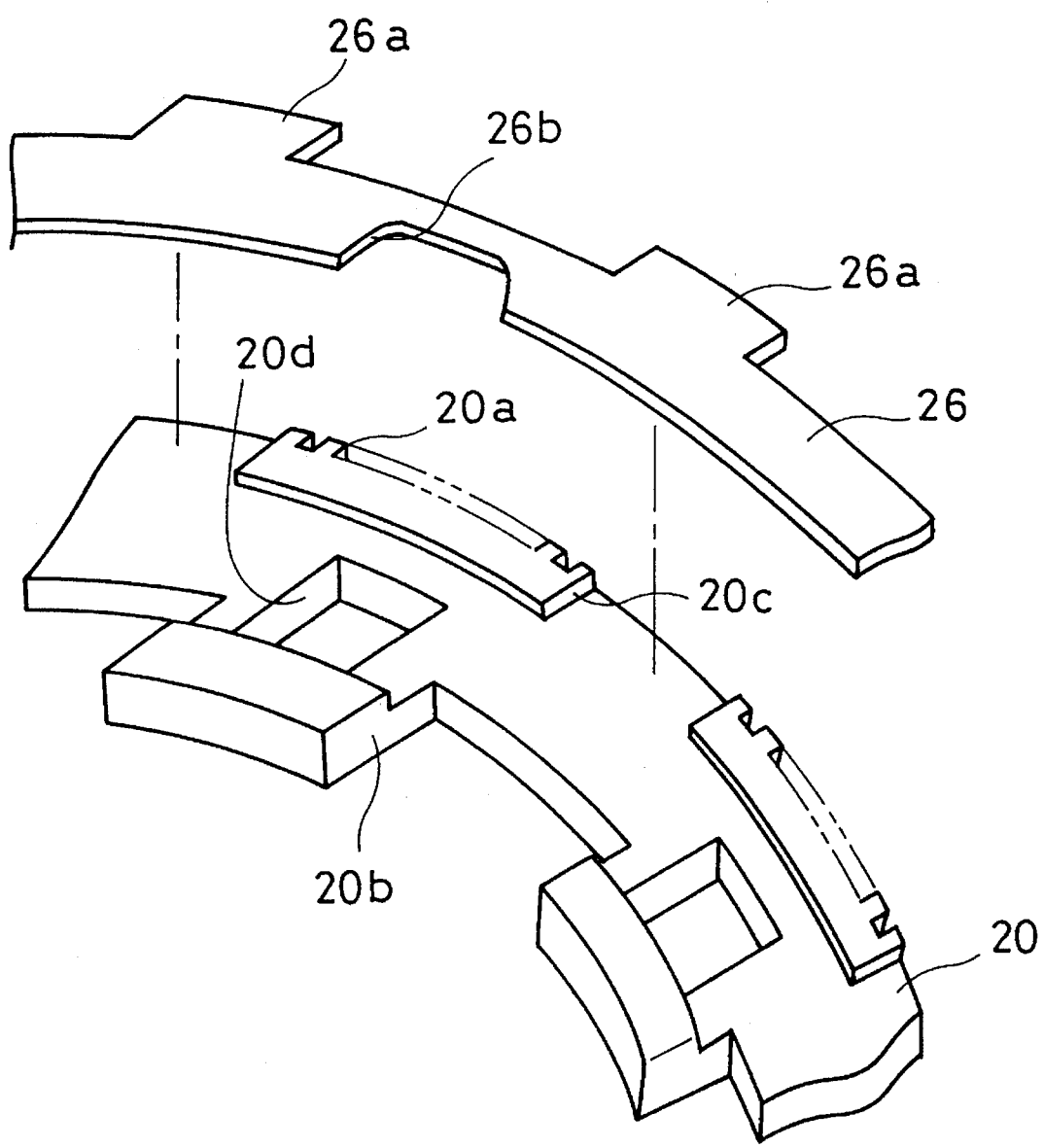
FIG. 3 is a partially enlarged perspective view of the hysteresis torque generating means.

The hysteresis torque generating mechanism 12 is disposed radially outward of the torsion spring 22, and has a thrust washer 25 disposed between a radially outer portion of one of the side plates 21a and the flange 20, and a wave spring 26 disposed between a radially outer portion of the other side plate 21b and the flange 20. The wave spring 26 is ring shaped and has a plurality of engaging projections 26a which are formed in its radially outer portion to project radially outward as shown in FIG. 3. Formed, oppositely, in the radially outer portion of the flange, are a plurality of engaging grooves 20c, which are equally spaced in the circumferential direction. The projections 26a of the wave spring 26 are engaged with the grooves 20c, whereby they inhibit the relative rotation between the wave spring 26 and the flange 20. In addition, a plurality of notches 26b are formed in a radially inner portion of the wave spring 26 so as not to interfere with the stopper pin 23. Holes 20d, through which the stopper pin 23 is passed, are also formed in the flange 20 so as not to interfere with the stopper pin 23 during operation of the hysteresis torque generating mechanism 12. The wave spring 26 is formed to have a wave shape over its whole periphery.

The following is a description of the operation of the lock up device.

In the lock-up device at the time of operation, hydraulic fluid is supplied to the hydraulic fluid chamber 16 through the hydraulic fluid passage 17. Consequently, the piston 13 is moved toward the turbine 3 such that the output clutch plate 15 is sandwiched between the two input plates 14. In this state, torque is directly transmitted to the elastic connecting mechanism 11 from the front cover 1 through the clutch mechanism 10. The torque is then further transmitted to the side plates 21a and 21b through the flange 20 and the torsion spring 22, where it is further transmitted to an output shaft from the turbine hub 6.

As torque varies, the torsion springs 22 expand and contract during operation, and there is relative rotation between the flange 20 and the side plates 21a and 21b. Since the flange 20 and the side plates 21a and 21c are pressed against each other by the wave spring 26, hysteresis torque is thereby obtained. Torque variations are damped by this hysteresis torque.

In the embodiment, the hysteresis torque generating mechanism 12 is disposed radially outward of the torsion spring 22, it is thereby possible to set larger the outer diameters of the thrust washer 25 and the wave spring 26, respectively. The larger diameter equates to a larger friction area, therefore a large hysteresis torque is obtainable under a small pressing load. Therefore, damping pressure provided from the thrust washer 25 or the wave spring 26 may be reduced in view of the increase in surface area for application thereof. Thus durability is improved.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. A lock-up torque converter comprising:

a torque converter housing having an impeller formed on an inner surface thereof, and a turbine and at least a first stator disposed therein;

an elastic connecting mechanism disposed within said torque converter housing generally rigidly connected to said turbine having at least one coil spring, said elastic connecting mechanism comprising:
a disc, in contact with said clutch mechanism, and
a first and second sideplate disposed to interpose said disc, connected to said turbine, and elastically connected to said disc;

a selectively engagable clutch mechanism disposed within said torque converter housing adjacent to said turbine; and a hysteresis torque generating mechanism connected to said elastic connecting mechanism, disposed radially outward from said coil spring and in contact with said clutch mechanism for producing friction in response to engagement of said clutch mechanism, said hysteresis torque generating mechanism comprising:
a friction member disposed between said first sideplate and said disc, said friction member being a thrust member; and
an urging member disposed between said second sideplate and said disc, said urging member being a wave spring comprising a stopper portion for stopping relative movement with respect to said disc whereby said disc and said wave spring rotate together.

2. A lock-up torque converter according to claim 1, wherein said disc is formed with a plurality of receiving formations, and said stopping portion of said wave spring is a plurality of stopper extensions which align with said plurality of receiving formations.

3. A lock-up torque converter according to claim 1, wherein said clutch mechanism comprises an input clutchplate, in spline connection with said torque converter housing, an output clutchplate, in spline connection with said disc radially outward of said disc, and a piston, for urging both of said clutchplates.

4. A lock-up torque converter as in claim 1 further comprising a second stator disposed in said torque converter housing.

* * * * *